United States Patent [19]

Kondo

[11] Patent Number: 4,807,901
[45] Date of Patent: Feb. 28, 1989

[54] AUTOMOTIVE REAR SUSPENSION SYSTEM
[75] Inventor: Toshiro Kondo, Hiroshima, Japan
[73] Assignee: Mazda Motor Corporation, Hiroshima, Japan
[21] Appl. No.: 111,876
[22] Filed: Oct. 23, 1987
[30] Foreign Application Priority Data Oct. 31, 1986 [JP] Japan ................................. 61-261029

[51] Int. Cl.$^4$ ............................................. B60G 21/00
[52] U.S. Cl. ...................................... 280/701; 280/690
[58] Field of Search ................ 280/701, 690, 688, 668
[56] References Cited

U.S. PATENT DOCUMENTS

| | | | |
|---|---|---|---|
| 4,269,432 | 5/1981 | Inoue et al. | 280/690 |
| 4,519,627 | 5/1985 | Shibahota et al. | 280/701 |
| 4,621,830 | 11/1986 | Kanai | 280/675 |
| 4,650,211 | 3/1987 | Tanahashi | 280/701 |

FOREIGN PATENT DOCUMENTS

| | | | |
|---|---|---|---|
| 148708 | 8/1985 | Japan | 280/701 |
| 987670 | 3/1965 | United Kingdom | 280/668 |

Primary Examiner—John A. Pekar
Assistant Examiner—Ross Weaver
Attorney, Agent, or Firm—Fleit, Jacobson, Cohn & Price

[57] ABSTRACT

An automotive suspension comprises a wheel support for rotatably supporting a rear wheel, a pair of front and rear lateral link systems for supporting the wheel support on the vehicle body so that it is swingable on the vertical and longitudinal directions of the vehicle body and producing a toe-in movement in the rear wheel when the rear wheel is subjected to rearward force, and a trailing link system for supporting resiliently either one of the wheel support and the connecting portion of the lateral links with the wheel support to the vehicle body so that the wheel support is allowed to travel a short distance in the longitudinal direction of the vehicle body. At least one of said front and lateral link systems is set to exhibit a non-linear deformation characteristic with respect to lateral force acting on the rear wheel. The trailing link system is set to exhibit a non-linear deformation characteristic which has a given relation with said non-linear deformation characteristic of said lateral link system. The suspension can produce a toe-in movement in the rear wheel with respect to the rearward force so that vehicle motional stability as well as riding comfort can be improved.

39 Claims, 9 Drawing Sheets

AUTOMOTIVE REAR SUSPENSION SYSTEM

BACKGROUND OF THE INVENTION

1. Field of the Invention

The present invention relates to a rear suspension for a motor vehicle.

2. Description of the Prior Art

There has been known an automotive rear suspension of the type as disclosed in U.S. Pat. No. 4,269,432 in which the rear suspension includes a wheel support for rotatably supporting the rear wheel, a pair of front and rear lateral links for supporting the wheel support on the vehicle body so that it is swingable in the vertical and longitudinal directions of the vehicle body, and a trailing link for supporting resiliently either one of the wheel support and the connecting portion of the lateral links with the wheel support so that the wheel support is allowed to travel a short distance in the longitudinal direction of the vehicle body. The distance between the outer connecting points of the lateral links with the wheel support is set to be smaller than that between the inner connecting points thereof with the vehicle body. Alternatively, the front lateral link is set to be shorter than the rear lateral link. By these arrangements, when rearward forces such as a braking force act on the rear wheels, the support member for the rear wheel is caused to travel rearward, and the rear wheel changes in position in the direction of the toe-in. Thus, vehicle motional stability is obtained.

Recently, developments have been made in rear suspension systems of the above-mentioned types so that a vehicle body displays desired characteristics according to motional conditions by means of toe-control of the rear wheels relative to lateral forces acting thereon. Such toe-control can be obtained by setting the characteristics of either the front or rear suspension system to be non-linear in repsonse to lateral forces acting on the rear wheel. For example, U.S. Pat. No. 4,621,830 discloses this type of automotive rear suspension which is desirably applied to a front-engine, front-wheel-drive type of motor vehicle which exhibits a tendency toward excessive under-steer when the magnitude of the lateral force is large. The suspension includes a front lateral link system, whose deformation characteristics are set to be non-linear. More specifically, a bush disposed between the lateral link and the vehicle body is set to exhibit a non-linear deformation characteristic. When the lateral force acting on the rear wheel becomes extremely large, such as during a sudden turn or changing of lanes at high speed, the rear wheel is controlled in its attitude so as to decrease the change in the toe-out direction, that is, to weaken the understeer characteristics so that drivability is improved, while driving stability is ensured with the application of a small magnitude of lateral force, or when the vehicle is moving at medium or low speed.

In a suspension system as described above, when the rear wheels are subjected to rearward force, the wheel supports for the rear wheels are caused to travel in the rearward direction to produce a toe-in movement therein. At the same time, there are produced deformations caused by the elastic deformation of the bushes etc. in the front and rear lateral link systems, whereby the rear wheel tends to produce a toe-out movement. In order to produce a toe-in movement in the rear wheel under the application of a rearward force, the magnitude of the toe-in must be larger than that of the toe-out.

However, where the deformation characteristics of the lateral link systems are set to be non-linear so as to control the toe direction relative the lateral force, the change in the toe-in movement in the rear wheel, which is caused by deformation in the lateral link systems, also exhibits non-linear characteristics. No consideration has been taken of this point, namely, the change in the toe movement in the rear wheel produced by the rearward force acting on the rear wheel. Hence, there remains a possibility that, when a rearward force of a certain magnitude acts on the rear wheel, the change in the toe-out direction of the rear wheel caused by the deformation in the lateral link systems can become larger than that in the toe-in direction thereof caused by the rearward traveling of the wheel support, by which the rear wheel can be undesirably changed in its attitude in the toe-out direction.

SUMMARY OF THE INVENTION

In view of the foregoing observations and description, a primary object of the present invention is to provide an automotive rear suspension having lateral link systems which exhibit a non-linear deformation characteristic with respect to both lateral and rearward forces acting on the rear wheels, in which the toe movement in the rear wheel can be desirably controlled, whereby vehicle motional stability can be ensured under all motional conditions.

To accomplish the above object, in the present invention, the rear wheel support is arranged so as to travel rearward under the application of a rearward force acting thereon to thereby produce a toe-in movement in the rear wheel, the amount of the toe-in movement being controlled to be larger than that of toe-out movement produced by the deformation in the lateral link systems. According to one aspect of the present invention, there is provided an automotive rear suspension system which comprises a wheel support member for supporting the rear wheel rotatably, a pair of front and rear lateral link means supporting the wheel support member on the vehicle body so that it is swingable in both the vertical and longitudinal directions of the vehicle body, and a trailing link means for resiliently supporting either the wheel support member or the connecting portion of the lateral link means with the wheel support member so that the wheel support member is allowed to travel a certain distance in the longitudinal direction of the vehicle body. The front and rear lateral link means are arranged so as to produce a toe-in movement in the rear wheel when the rear wheel is subjected to a rearward force. At least one of the front and rear lateral link means is set to exhibit a non-linear deformation characteristic with respect to a lateral force acting on the rear wheel. The trailing link means is also set to have a non-linear deformation characteristic responding to that of the lateral link means.

According to the suspension with the above arrangement, when rearward force acts on the rear wheel, the front and rear lateral link means are deformed to produce a toe-out movement on the rear wheel. This change in the toe-out direction exhibits a non-linear relationship with the rearward force on the basis of the non-linear deformation characteristics of the lateral link means. At the same time, the trailing link means is deformed to move the wheel support rearward, which produces a toe-in movement in the rear wheel which is in accordance with the non-linear deformation characteristics of the trailing link means. Therefore, by setting the desired relationship between the non-linear deformation characteristics of the lateral link means and those of the trailing link means, the rear wheel can be reliably controlled in the toe direction so as to produce a toe-in movement irrespective of the amount of the rearward force acting thereon. Further, the deformation characteristics of the trailing link means is set to be non-linear with respect to rearward forces acting thereon, so that this deformation characteristic does not adversely affect the riding comfort of the vehicle. In addition, the trailing link means does not have any effect on the toe control of the rear wheel when lateral force is applied thereto, which means that only the lateral links means control the toe movement in the rear wheel with a given non-linear characteristic. Hence, the toe movement in the rear wheels can be desirably controlled with respect to lateral forces acting thereon.

Other objects and the advantages of the present invention will become apparent from the following detailed description.

DESCRIPTION OF THE PREFERRED EMBODIMENT

While the present invention will be described in connection with preferred embodiments, it will be understood that we do not intend to limit the invention to these embodiments. On the contrary, we intend to cover all alternatives, modifications, and equivalents as may be included within the spirit and scope of the invention as defined by the attached claims.

Figure 1:
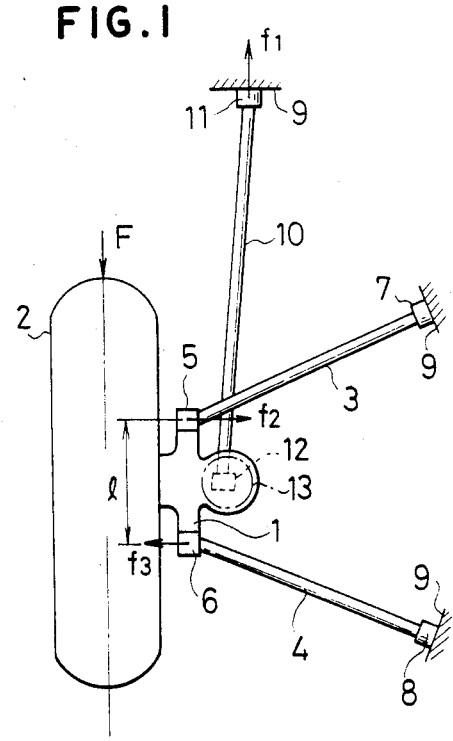
FIG. 1 is a schematic plan view of an example of a rear suspension in accordance with the present invention.
Figure 2:
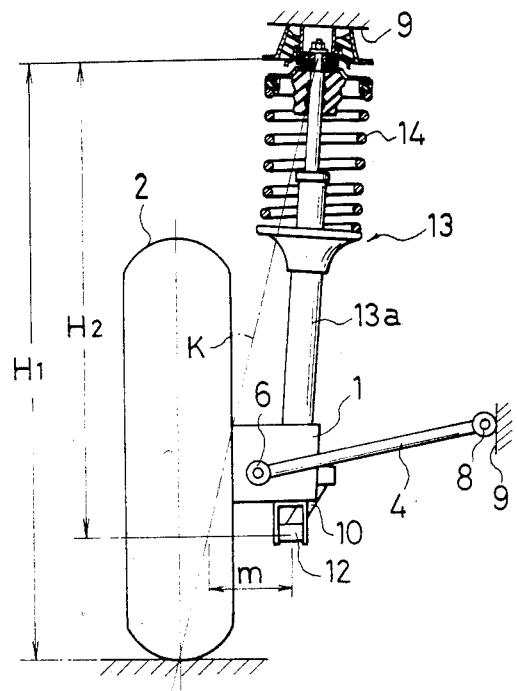
FIG. 2 is a rear elevational view of the rear suspension shown in FIG. 1.

Now referring to the drawings, FIGS. 1 and 2 illustrate an embodiment of an automotive rear suspension system having a shock absorber means of the strut type. The suspension system includes a wheel support 1 for supporting a rear wheel 2 rotatably and a pair of front and rear lateral links 3 and 4 extending in the lateral direction of the vehicle body 9 between the wheel support 1 and the vehicle body 9. The front lateral link 3 is conneced at the outer end to the front of the wheel support 1 via a bush 5 and is connected at the inner end to the vehicle body 9 via a bush 7 so that it is swingable in the vertical direction and in the longitudinal direction of the vehicle body by the elastic deformation of the bush 7. Likewise, the rear lateral link 6 is connected at its outer and inner ends via bushes 6 and 8 to the rear of the wheel support 1 and to the vehicle body in a similar manner to the front lateral link 5. The front and rear lateral links 5, 6 are arranged so that the distance between the outer connecting points, the bushes 5 and 6 is smaller than that between the inner connecting points, the bushes 7 and 8, to thereby define a trapezoidal configuration with the wheel support 1 and the vehicle body 9.

A trailing link 10 is disposed to extend in the longitudinal direction of the vehicle body between the heel support 1 and the vehicle body 9 and is connected at its front end with the vehicle body via a bush 11 and at its rear end with the lower end of the wheel support 1 via bush 12. By the elastic deformation of the bushes 11, 12, the trailing link 10 supports the wheel support movably in the longitudinal direction of the vehicle body. A shock absorber 13 is disposed between the upper end of the wheel support 1 and the vehicle body 9, and comprises a strut 13a and a coil spring 14 disposed coaxially around the rod of the strut 13a.

Figure 9:
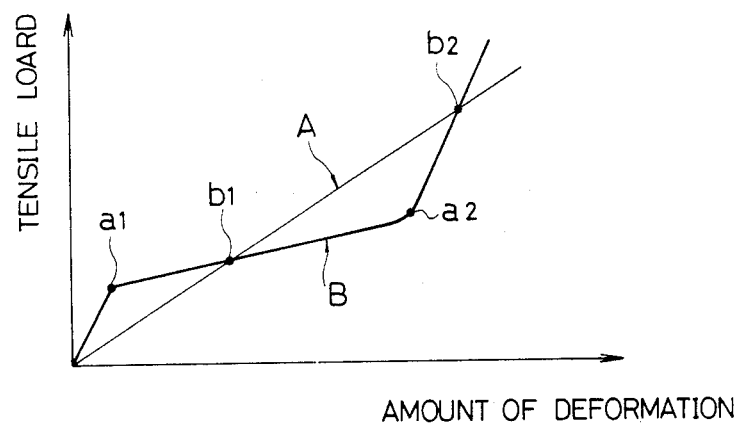
FIG. 9 shows the deformation characteristics of the lateral link means which can be provided with the suspension of the present invention.

As shown in FIG. 9, the front lateral link system that includes bushes 5 and 7 is set to have a deformation characteristic which is different from that of the rear lateral link system that includes bushes 6 and 8. The deformation of the front lateral link system is set to exhibit a substantially linear relationship with lateral force acting on the rear wheel, as shown by the line A. Whereas, the deformation characteristic of the rear lateral link system is set to be non-linear, having two bending points a1 and a2 with respect to the lateral force as shown by the line B. The characteristic lines A and B intersect at two points, b1 and b2, which means that the amount of the deformation in the front lateral link system is larger than that in the rear lateral link system when the magnitude of the lateral force is below b1 and above b2, while it is smaller than that in the rear lateral link system when the magnitude of the lateral force is between b1 and b2.

Figure 10:
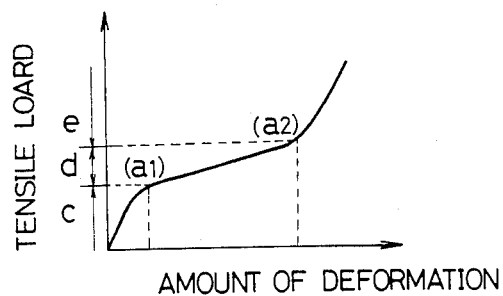
FIG. 10 shows the deformation characteristics of the trailing link means which can be employed in a suspension with a lateral link means, the characteristics of which are shown in FIG. 9.

FIG. 10 shows the deformation characteristic of the trailing link system which includes the bushes 11 and 12. As can be seen, it is set to be non-linear, having two bending points with respect to tensile force acting on the trailing link system, which responds to the non-linear characteristic of the rear lateral link system shown by the line B in FIG. 9. In order to obtain this characteristic, the trailing link system exhibits a relatively high elastic modulus in the regions c and e where the tensile force is small and large, respectively, while it exhibits a relatively low elastic modulus in the region d between the regions c and e.

Figure 3:
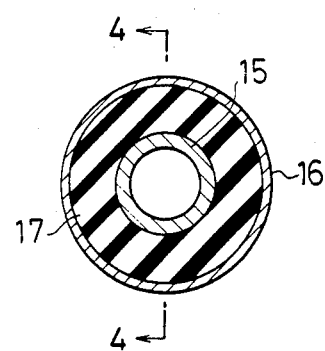
FIG. 3 is a sectional view of an example of a bush which can be employed in the lateral link means and the trailing link means of the suspension shown in FIG. 1.
Figure 4:
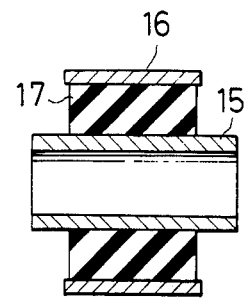
FIG. 4 is a cross-sectional view of the bush taken along the line 4—4 in FIG. 3.
Figure 5:
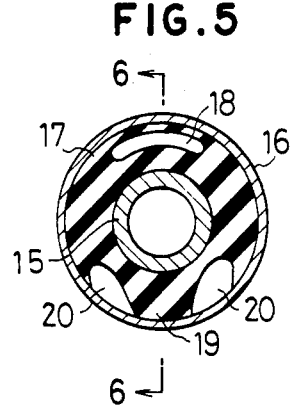
FIG. 5 is a sectional view of an example of a bush having a non-linear deformation characteristic which can be employed in the lateral link means and the trailing link means in the suspension of FIG. 1.
Figure 6:
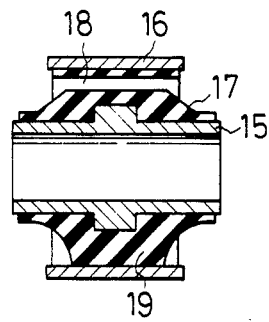
FIG. 6 is a cross-sectional view of the bush taken along the line 6—6 in FIG. 5.

Next, there will be described the constitution of the rear lateral link system and the trailing link system for obtaining the above-mentioned non-linear characteristic having two bending points. One example of this is to provide the bush 8 or bush 10 with a non-linear deformation characteristic, while the bushes 6, 12 and 5, 7 are provided with a linear deformation characteristic. An embodiment of such a bush having a linear characteristic is shown in FIGS. 3 and 4. The bush is of a common type and comprises an inner tube 15, an outer tube 16 and a rubber member 17 between the outer and inner tubes. An embodiment of the bushes 8 and 10 is shown in FIGS. 5 and 6. The bush comprises an outer tube 15, an inner tube 16 and a rubber member 17 provided with a void 18 of an arcuate section, and a pre-compressed portion 19. The arcuate void 18 is formed in one side of the rubber member relative to the inner tube 15 and is positioned on the axial line 4a or 8a of the rear lateral link 4 or the trailing link 10. The pre-compressed portion 19 is positioned on the opposite side of the void 18 relative to the inner tube 15, which is in the form of a protrusion as defined by a pair of grooves 20, 20 and is pre-compressed in the radial direction of the inner tube 15 so as to position the inner tube relative to the outer tube 16. The bush exhibits a small change in deformation due to the pre-compression of the rubber member when the force acting thereon along the axial line 4a or 10a is lower than that of a11 shown in FIG. 9, and a large change in deformation due to the collapse of the void 18 in the rubber member when the force is between the points a1 and a2. It again exhibits a small change in deformation after the void is completely collapsed and the force exceeds the point a2.

Figure 7:
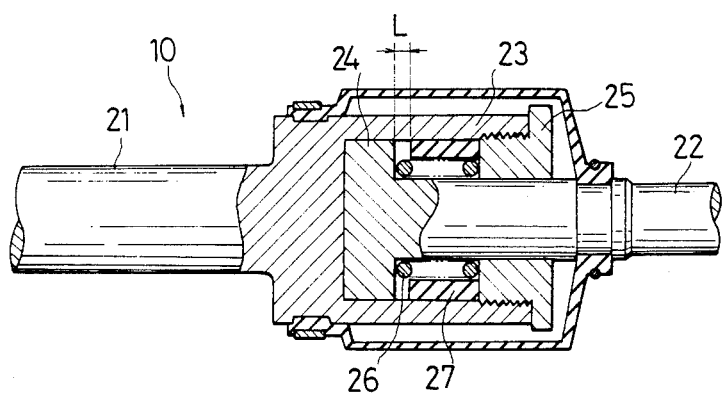
FIG. 7 is a sectional view of a bush having a non-linear deformation characteristic which can be employed in a trailing link means of the divided type.

Another embodiment of the trailing link system having a non-linear characteristic relative to the tensile force, that is the rearward force acting on the rear wheel, will be explained. As shown in FIG. 7, a lateral link of a divided type is employed in the trailing link system. The lateral link comprises a front link member 21 and a rear link member 22, the rear end of the front link member 21 being provided with a cylinder 23 opening rearward and the front end of the rear link member 22 being provided with a piston 24 inserted into the cylinder 23 slidably. The piston 24 is prevented from coming out of the cylinder 23 by a cap member threaded into the opening of the cylinder so as to maintain the connecting condition of the front and the rear link members 21 and 22. A coil spring 26 is disposed in the cylinder in a compressed condition so as to force the piston 24 against the bottom surface of the cylinder 23. A tubular elastic member 27 is disposed around the coil spring 26 with the bottom surface being mounted on the cap member 25 and the end surface being spaced apart from the piston 24 by a distance L. In this divided type trailing link, when the trailing link system is being subjected to a relatively small rearward force, the coil spring is not compressed in its length due to the pre-compression thereof. Therefore, the trailing link system exhibits a relatively high elastic modulus defined by the bushes disposed at each end of the trailing link 10. After the tensile force caused by the rearward force becomes larger than the pre-compression force of the spring 26, the spring 26 begins decreasing in length with the relatively low elastic modulus thereof. Thus, the trailing link system exhibits a relatively low elastic modulus defined by the spring 26. After the spring 26 has been reduced in length by L and the piston 24 has abutted against the elastic member 27, the trailing link system exhibits a relatively high elastic modulus defined by the elastic member 27 and the coil spring 26.

Figure 8:
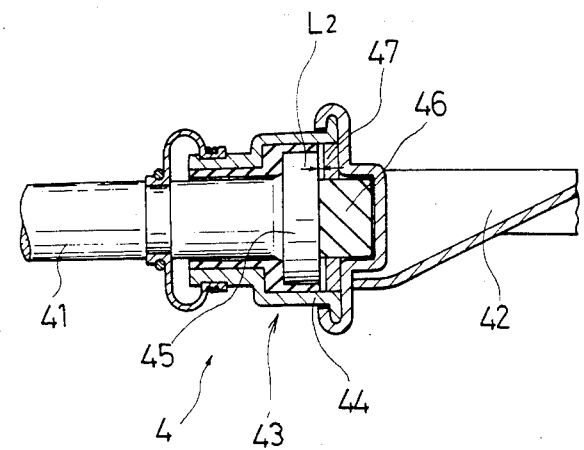
FIG. 8 is a sectional view of another type of bush which can be employed in a trailing link means.

The rear lateral link system having a non-linear characteristic can also be realized by employing a lateral link of the divided type, an embodiment of which is shown in FIG. 8. The lateral link comprises a wheel-side member 41, a vehicle-body side member 42 and a connecting portion 43 thereof. The connecting portion comprises a cylinder 44 formed on the end of the vehicle-body side member 42 and a piston 45 formed on the end of the wheel-side member 41 inserted into the cylinder slidably. Between the cylinder and the piston, a pre-compressed rubber member 46 is disposed so that it is in contact at both end surfaces with the piston and the cylinder. A hard rubber member 47 is disposed around the pre-compressed rubber member 46 so that it is in contact at one end surface with the cylinder 44 and is spaced at the other end surface from the piston 45 by a distance L2. According to this arrangement, the pre-compressed rubber 46 is not deformed until the force exceeds the value a1. The piston comes in contact with the hard rubber 47 when the force becomes equal to the value a2. After that, the hard rubber 47 is deformed.

In operation, the lateral force acts on the rear wheel and is transmitted through the wheel support 1 to the front and rear lateral link system as equal compression forces. The deformation characteristic of the front lateral link system differs from that of the rear lateral link system as shown in FIG. 9, so that the rear wheel is controlled in the toe movement according to the characteristic line shown in FIG. 11. The points a1, a2, b1 and b2 correspond to those in FIG. 9. As shown by the characteristic line, the front lateral link system is deformed more than the rear lateral link system when the lateral force is relatively small, so that the rear wheel is moved in the toe-in direction, whereby straight stability of the vehicle can be ensured. When the lateral force is medium in magnitude, the front lateral link system is deformed less than the rear lateral link system, which results in a decrease in the tendency of toe-in movement in the rear wheel or produces a toe-out movement of the rear wheel. Therefore, turning ability and steering ability can be improved. In other words, toe-in movement in the rear wheel is reduced so that the under-steering tendency is weakened compared to when the toe-in movement is large, so that the steering response can be improved. When the lateral force becomes large, the toe-in movement in the rear wheel is again produced to thereby present an under-steering tendency, whereby driving stability is obtained during sharp turns and lane changes at high speed.

In operation, where a rearward force F such as a braking force acts on the rear wheel, a tensile force f1 is applied to the trailing link system, a tensile force f2 is applied to the front lateral link system, and a tensile force f3 is applied to the rear lateral link system. The magnitudes of these forces can be defined by the following formulas.

$$f1 = F \times (H1/H2)$$

$$f2 = f3 = F \times (m/1)$$

wherein H1 is the height from the ground to the top of the shock absorber 13, H2 is the height from the connecting point of the trailing link 10 to the wheel support 1 (the bush 12) to the top of the shock absorber 13, 1 is the distance in the longitudinal direction between the connecting points of the front and rear lateral links with the wheel support, and m is the lateral distance from the connecting point between the trailing link 10 and the wheel support 1 to the line extending through the top of the shock absorber 13 and the center of the tread surface of the rear wheel 2.

Figure 12:
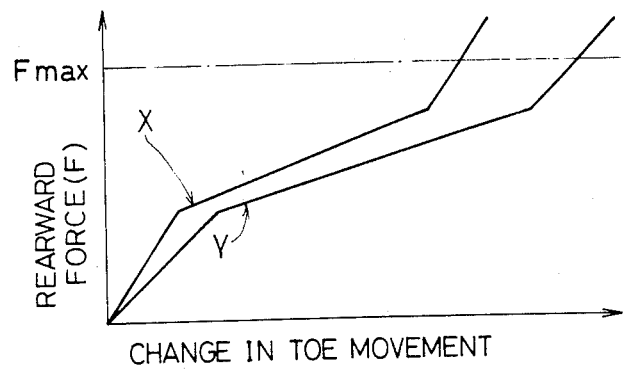
FIG. 12 shows change in the toe movement in the rear wheel with respect to rearward force in one example of the suspension.

The front and rear lateral link systems are deformed by the forces f1 and f2 to produce the toe-out movement in the rear wheel. The trailing link system is deformed by the force f3 to allow the rear wheel to move rearward, so that the toe-in movement in the rear wheel is produced. Hence, the toe movement of the rear wheel 2 depends on whether the magnitude of the toe-in movement produced by the lateral link systems is larger or the toe-out movement produced by the trailing link system is larger. Since the rear lateral link system is set to have a non-linear characteristic with two bending points, the toe-out movement of the rear wheel is produced along the non-linear line X having two bending points as shown in FIG. 12 with respect to the rearward force F. On the contrary, since the trailing link system is set to have a non-linear characteristic having two bending points in response to the non-linear one of the rear lateral link system, the wheel support is moved rearward to produce the toe-in movement in the rear wheel along the line Y having two bending points as shown in FIG. 12. Accordingly, where the rearward force acting on the rear wheel is lower than the force F max, the toe-in movement in the rear wheel 2 produced by the movement of the rear wheel rearward is controlled to be larger than the toe-out movement thereof produced by the lateral link systems. Hence, the rear wheel can be maintained in toe-in condition relative to the rearward force acting thereon. Further, the deformation characteristic of the trailing link system is not only set to produce a larger toe-in movement but also set to be non-linear so as to respond to the non-linear toe-out movement in the rear wheel produced by the lateral link systems. Therefore, the deformation characteristic of the trailing link system does not adversely affect the vibration-preventing ability thereof, and the driving quality can be maintained in the desired condition.

Further, it can be suppressed that the non-linear deflection of the lateral link system affects the toe-in movement of the rear wheel caused by a rearward movement of the wheel. Thus, a desirable toe-in movement property can be obtained.

Figure 11:
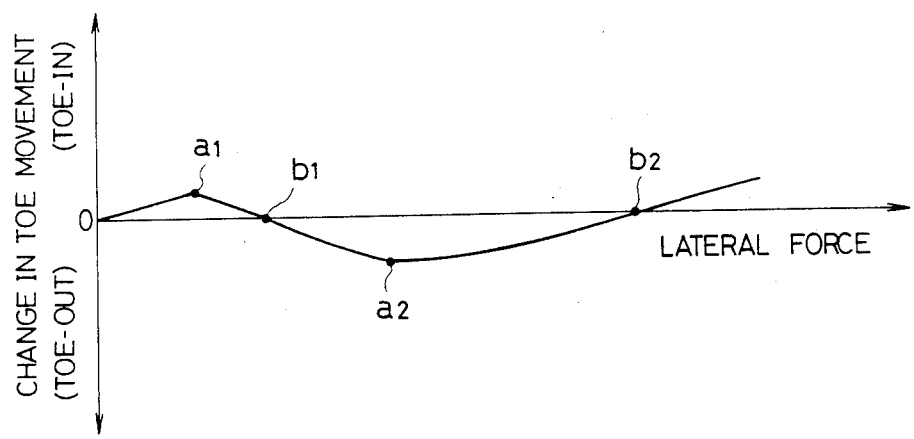
FIG. 11 shows changes in the toe movement in the rear wheel respect to lateral force in one example of a suspension according to the invention.

In the above-mentioned suspension, the front lateral link system is set to have a linear deformation characteristic and the rear lateral link system is set to have a non-linear one with two bending points in order to produce the toe-in movement in the rear wheel as defined by the line in FIG. 11. Alternatively, both the front and rear lateral link systems can be set to have a non-linear deformation characteristic having only one bending point as shown in FIG. 13.

Figure 13:
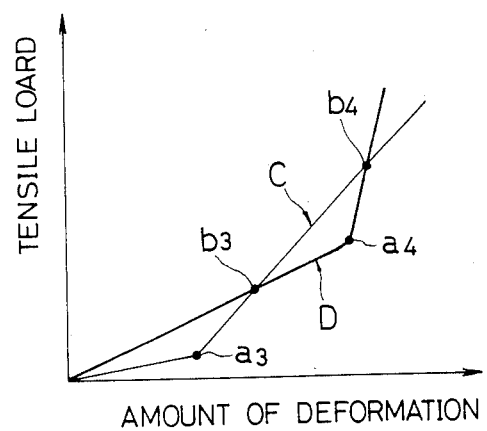
FIG. 13 shows the deformation characteristics of the lateral link means which can be provided with the suspension of the present invention.

In FIG. 13, the front lateral link system has a non-linear deformation characteristic defined by the line C having a bending point a3, whereas the rear one has a non-linear deformation characteristic defined by the line D having a bending point a4. These characteristic lines C and D intersect at two points b3 and b4 and therefore the amount of deformation in the front lateral link system is larger than that in the rear lateral link system where the lateral force acting on the rear wheel is lower than the value b3 and higher than the value b4, while the former is smaller than the latter where the lateral force is between the values b3 and b4. As will be understood, the points b3 and b4 correspond to the points b1 and b2 in FIGS. 9 and 11, and so the toe control of the rear wheel relative to the lateral force can be carried out according to the characteristic line shown in FIG. 11 in a similar manner as aforementioned.

There will be described arrangements of the lateral link system having a non-linear characteristic with one bending point. One embodiment of such lateral link systems is such that the front and rear lateral link systems are provided with bushes as shown in FIGS. 14, 15 and 16, 17 as the bushes 7 and 8 at their body-side ends, respectively.

Figure 14:
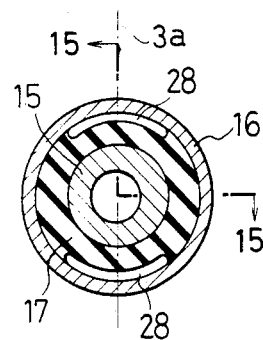
FIG. 14 is a cross-sectional view of a bush having a non-linear deformation characteristic which can be employed in the suspension of the invention.
Figure 15:
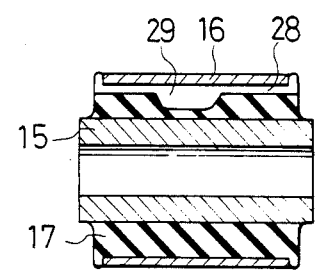
FIG. 15 is a sectional view of the bush taken along the line 15—15 in FIG. 14.

The bush shown in FIGS. 14, 15 applied as the bush 7 comprises an inner tube 15, an outer tube 16 and a rubber member 17 between the tubes. The rubber member is formed with a pair of first voids 28 of an arcuate section extending along its axis on opposite sides relative to the inner tube 15. The voids 28, 28 are positioned on the axial line 3a of the lateral link 3. At the middle of one of the voids 28, 28, second voids 29 are provided in the form of an arcuate groove. When the lateral force is small, the change in deformation of the bush is large due to the existence of the voids 28, 28, whereas after the voids are collapsed, the change in deformation thereof becomes small. However, due to the existence of the voids 29, the change in the deformation is still relatively large compared to that produced when a solid rubber member is provided (refer to the line C in FIG. 13).

Figure 16:
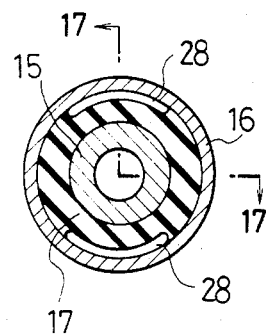
FIG. 16 is a cross-sectional view of a bush having a non-linear deformation characteristic which can be employed in the suspension of the present invention.
Figure 17:
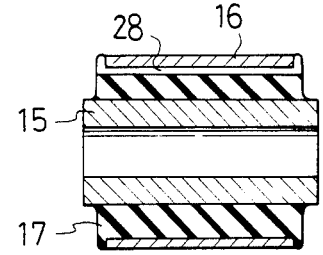
FIG. 17 is a sectional view of the bush taken along the line 17—17 in FIG. 16.

The bush shown in FIGS. 16, 17 applied as the bush 8 has a similar structure to that of the bush shown in FIGS. 14, 15 except that the second void 29 is not provided. Owing to the absence of the void 29, the deformation characteristic of this bush is smaller than that of the bush having the void 29 until the voids 28 are collapsed and also continues to be smaller after the voids 28 have collapsed, as shown by the line D in FIG. 13.

Figure 18:
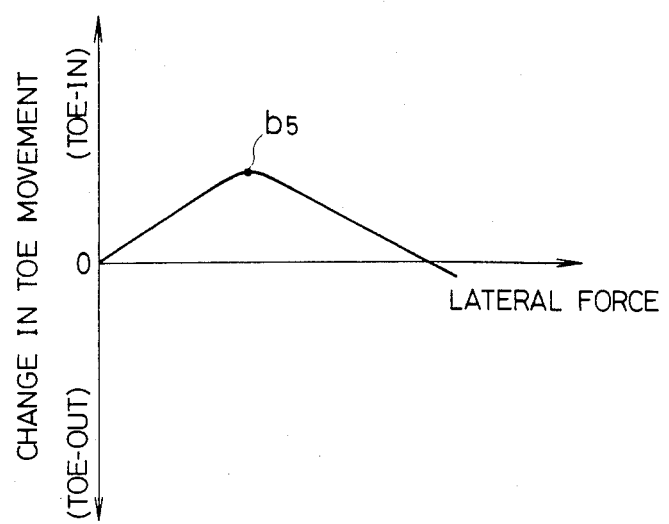
FIG. 18 shows change of the toe movement in the rear wheel with respect to lateral force in another example of the suspension.

Although the above-mentioned embodiments, the toe control of the rear wheel relative to the lateral force is carried out in three different modes according to the magnitude of the lateral force, it can alternatively be carried out in two different modes. In a front-engine, front drive vehicle, for example, the tendency toward under-steer becomes undesirably strong as the lateral force becomes large. The suspension system used in such a vehicle should desirably produce a toe-out movement in the rear wheel, namely should weaken the tendency toward under-steer when the lateral force is extremely large during sharp turning and lane changes at high speed, whereas it should produce a toe-in movement in the rear wheel when the lateral force is small during lane changes at medium or low speed. This characteristic of the toe movement is shown in FIG. 18.

Figure 19:
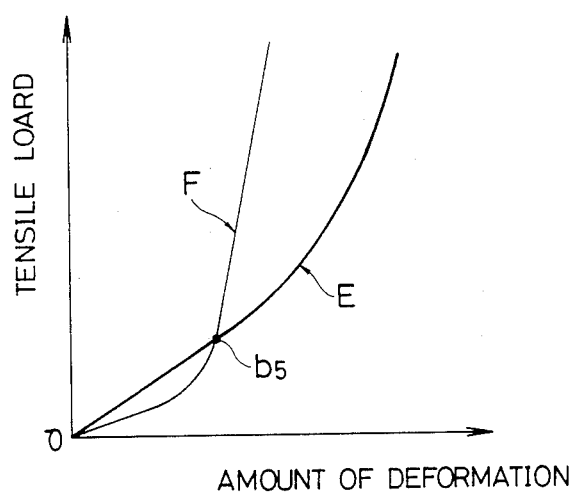
FIG. 19 shows the deformation characteristics of the lateral link means and the trailing link means with respect to lateral force in another example of the invention.

To this end, the deformation characteristic in the rear lateral link system is set to be substantially linear as shown by the line E in FIG. 19 and that in the front lateral link system is set to be non-linear as shown by the line F in FIG. 19. As the lines E and F intersect at the point b5, the front lateral link system produces a deformation larger than that produced in the rear lateral link system when the lateral force is below the value b5, whereas it is smaller than that produced in the rear lateral link system when the lateral force is larger than the value b5. In addition, the deformation characteristic of the trailing link system is set to be non-linear in response to the non-linear deformation characteristics of the front lateral link system in order to produce a toe-in movement in the rear wheel when the rear wheel is subjected to a rearward force.

Figure 20:
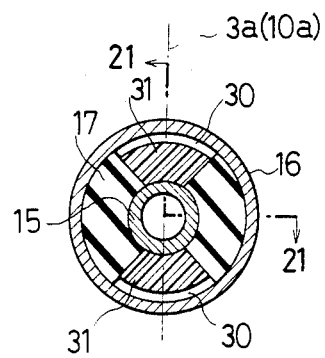
FIG. 20 shows a cross-sectional view of another example of a bush which can be employed in a suspension of the invention.
Figure 21:
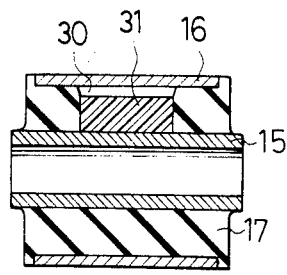
FIG. 21 is a sectional view of the bush taken along the line 21—21 in FIG. 20.

These deformation characteristic can be realized by, for example, the following arrangement. Namely, the front lateral link 3 and the trailing link 10 is provided at their vehicle-body side ends with the bushes 8 and 11 having the structure shown in FIGS. 20 and 21. The bush is provided with a rubber member 17 between inner and outer tubes, which comprise a pair of arcuate voids 30, 30 on the opposite side with respect to the inner tube 15 positioned on the axial line 3a or 11a. In the voids 30, 30, a pair of arcuate rubber members 31, 31 of hard synthetic resin are disposed to adhere to only the outer surface of the inner tube 15, whereby a pair of voids are defined between the outer surface of the arcuate rubber members and the inner surface of the outer tube 16.

Figure 22:
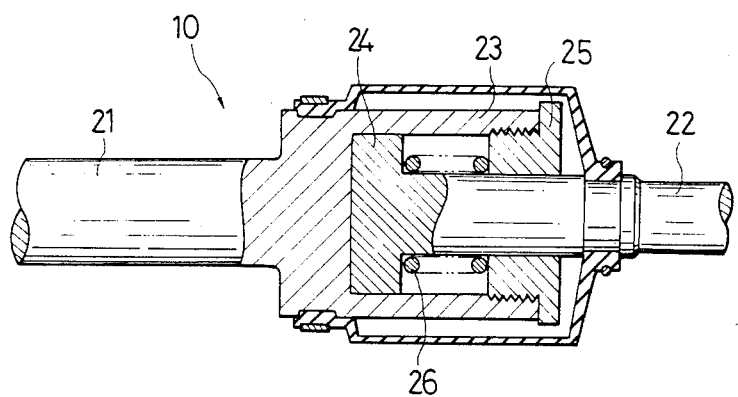
FIG. 22 is a sectional view of another example of bush which can be provided in a trailing link means of the divided type; and, FIG. 23 shows another embodiment of a suspension according to the invention.

Alternatively, the trailing link may be of a divided type as shown in FIG. 22 so as to provide a deformation characteristic having one bending point. As shown in FIG. 22, this type of trailing line has a similar constitution to that of the trailing link shown in FIG. 7 except for the absence of the resilient member 27.

Figure 23:
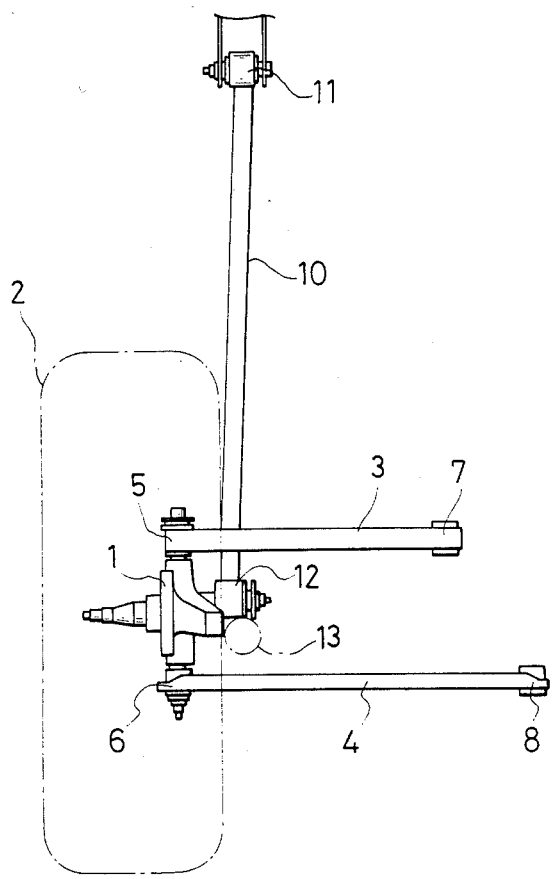

In the above-mentioned embodiments, the connecting points, bushes 5 and 6, of the front and rear lateral links 3 and 4 to the wheel support are positioned so that the distance between them is larger than that of the connecting points, bushes 7 and 8, of the lateral links 3, 4 to the vehicle body to thereby produce a toe-in movement in the rear wheel when the rear wheel is subjected to rearward force. Alternatively, the front lateral link 3 may be shorter in length than the rear lateral link 4 and arranged substantially in parallel, as shown in FIG. 23. Or, they may be arranged so as to be apart from each other toward the vehicle-body side.

I claim:

1. An automotive rear suspension comprising a wheel support for rotatably supporting a rear wheel, a pair of front and rear lateral link systems for supporting the wheel support on the vehicle body so that it is swingable in the vertical and longitudinal directions of the vehicle body and produces a toe-in movement in the rear wheel when the rear wheel is subjected to rearward force, and a trailing link system for supporting resiliently either one of the wheel support and the connecting portion of the lateral links with the wheel support to the vehicle body so that the wheel support is allowed to travel a short distance in the longitudinal direction of the vehicle body, at least one of said front and rear lateral link systems being provided with a non-linear deformation means which exhibits a non-linear deformation characteristic with respect to compression force caused by lateral force acting on the rear wheel and acting on the lateral link system, and said trailing link system being set to exhibit a non-linear deformation characteristic which has a given relation with said non-linear deformation characteristic of said lateral link system.

2. The automotive rear suspension as defined in claim 1, wherein the wheel support supported by the trailing link system is moved rearward by the application of rearward force on the rear wheel to produce a toe-in movement in the rear wheel, the amount of which is larger than that of a toe-out movement in the rear wheel produced by the deformation of the lateral link systems.

3. An automotive rear suspension comprising a wheel support for rotatably supporting a rear wheel, a pair of front and rear lateral link systems for supporting the wheel support on the vehicle body so that it is swingable in the vertical and longitudinal directions of the vehicle body and produces a toe-in movement in the rear wheel when the rear wheel is subjected to rearward force, and a trailing link system for supporting resiliently either one of the wheel support and the connecting portion of the lateral links with the wheel support to the vehicle body so that the wheel support is allowed to travel a short distance in the longitudinal direction of the vehicle body, at least one of said front and rear lateral link systems being set to exhibit a non-linear deformation characteristic with respect to lateral force acting on the rear wheel, and said trailing link systems being set to exhibit a non-linear deformation characteristic which has a given relation with said non-linear deformation characteristic of said lateral link system, wherein said wheel support supported by the trailing link system is moved rearward by the application of rearward force on the rear wheel to produce a toe-in movement in the rear wheel, the amount of which is larger than that of a toe-out movement in the rear wheel produced by the deformation of the lateral link systems, and, wherein the non-linear deformation characteristic of said lateral link system with respect to the lateral force acting on the rear wheel is set so as to produce a toe-in movement in the rear wheel when the magnitude of the lateral force is below a given value and to produce a toe-out movement therein when the magnitude of the lateral force is larger than the given value.

4. The automotive rear suspension as defined in claim 3, wherein said trailing link system is set to have a large elastic modulus when rearward force acting on the rear wheel is below a given value and to have a small elastic modulus when the rearward force is greater than the given value, so that the trailing link system is provided with the non-linear deformation characteristic.

5. The automotive rear suspension as defined in claim 4, wherein said trailing link system includes a trailing link extending along the longitudinal direction of the vehicle body, which is connected at front end to the vehicle body via a bush having a non-linear deformation characteristic.

6. The automotive rear suspension as defined in claim 4, wherein said trailing link system includes a trailing link extending along the longitudinal direction of the vehicle body which comprises a front link member, a rear link member and a resilient member between said front and rear link members, said resilient member having a non-linear deformation characteristic.

7. The automotive rear suspension as defined in claim 4, wherein said rear lateral link system is set to have a non-linear deformation characteristic.

8. The automotive rear suspension as defined in claim 7, wherein said rear lateral link system includes a rear lateral link extending laterally, which is connected at its laterally inward end to the vehicle body via a bush having a non-linear deformation characteristic.

9. The automotive rear suspension as defined in claim 7, wherein said rear lateral link comprises a wheel-side member, a vehicle-body side member and a resilient member disposed between them, said resilient member being set to have a non-linear deformation characteristic.

10. The automotive rear suspension as defined in claim 4, wherein said front lateral link system is set to have a non-linear deformation characteristic.

11. The automotive rear suspension as defined in claim 10, wherein said rear lateral link system is set to have a non-linear deformation characteristic.

12. The automotive rear suspension as defined in claim 11, wherein the deformation characteristics of the front and rear lateral link systems are defined respectively by lines having one bending point, the values of the bending point being set to be different from each other.

13. The automotive rear suspension as defined in claim 12, wherein said bush disposed between the front lateral link and the vehicle body comprises an inner tube, an outer tube coaxially disposed around the inner tube and a rubber member disposed between the tubes, said rubber member being provided with a pair of first arcuate voids positioned on opposite sides relative to the inner tube and on the axial line of said front lateral link, each of said voids being provided with a second arcuate void in the form of the groove formed on the rubber surface on the middle of the first void, and wherein said bush disposed between the rear lateral link and the vehicle body comprises an inner tube, an outer tube coaxially disposed around the inner tube and a rubber member disposed therebetween, said rubber member being provided with a pair of arcuate voids positioned on opposite sides relative to the inner tube and on the axial line of said rear lateral link.

14. The automotive suspension as defined in claim 10, wherein said bush disposed between the front lateral link and the vehicle body comprises an inner tube, an outer tube axially disposed around the inner tube, a pair of arcuate rubber members, said arcuate first rubber members defining therebetween a pair of arcuate void areas positioned on the opposite sides relative to the inner tube and on the axial line of the front lateral link, and a pair of arcuate second rubber members disposed in said arcuate void areas and connected only to the inner tube which defines a pair of arcuate voids disposed between the other surfaces of the second rubber members and the inner surfaces of the outer tube, said first rubber members being set to be softer in rigidity than said second rubber members.

15. The automotive rear suspension as defined in claim 14, wherein said bush disposed between the trailing link and the vehicle body comprises an inner tube, an outer tube axially disposed around the inner tube, a pair of arcuate rubber members, said arcuate first rubber members defining therebetween a pair of arcuate void areas positioned on the opposite sides relative to the inner tube and on the axial line of the front lateral link, and a pair of arcuate second rubber members disposed in said arcuate void areas and connected only to the inner tube which defines a pair of arcuate voids disposed between the outer surfaces of the second rubber members and the inner surfaces of the outer tube, said first rubber members being set to be softer in rigidity than said second rubber members.

16. The automotive rear suspension as defined in claim 14, wherein said trailing link comprises a front member, a rear member and a connecting portion therebetweeen, said connecting portion comprising a cylinder formed on the end of said front member, a piston formed on the end of said rear member and slidably inserted into said cylinder, a cap member threaded into the cylinder for preventing said piston from coming out of said cylinder, and a coil spring disposed between the rear end of said piston and the front end of said cap member in a pre-compressed condition.

17. The automotive rear suspension as defined in claim 3, wherein at least one of said lateral link systems is set to have a non-linear deformation characteristic so that it produces a toe-in movement of said rear wheel when lateral force acting on the rear wheel is below a first given value and above a second given value and that it produces a toe-out movement in the rear wheel when said lateral force is between said first value and said second value.

18. The automotive rear suspension as defined in claim 17, wherein said trailing link system is set to have a non-linear deformation characteristic so that it exhibits a large elastic modulus when rearward force acting on the rear wheel is below a first given value, a small elastic modulus when the rearward force is between the first given value and a given second value which is larger than the first given value, and a large elastic modulus when the rearward force is above the second given value.

19. The automotive rear suspension as defined in claim 18, wherein said trailing link system includes a trailing link extending along the longitudinal direction of the vehicle body, which is connected at front end to the vehicle body via a bush having a non-linear deformation characteristic.

20. The automotive rear suspension as defined in claim 19, wherein said bush disposed between the trailing link and the vehicle body comprises an inner tube, an outer tube coaxially disposed around said inner tube and a rubber member disposed between said inner and outer tubes, said rubber member being provided with an arcuate void on one side thereof relative to the inner tube and a pre-compressed portion defined by a pair of grooves formed therein on the opposite side, said arcuate void and said pre-compressed portion being positioned on the axial line of said trailing link.

21. The automotive rear suspension as defined in claim 18, wherein said trailing link system includes a trailing link extending along the longitudinal direction of the vehicle body which comprises a front link member, a rear link member and a resilient member between said front and rear link member, said resilient member having a non-linear deformation characteristic.

22. The automotive rear suspension as defined in claim 21, wherein said trailing link comprises a front member, a rear member and a connecting portion therebetween, said connecting portion comprising a cylinder formed on the end of said front member, a piston formed on the end of said rear member and slidably inserted into said cylinder, a cap member threaded into the cylinder for preventing said piston from coming out of said cylinder, a coil spring disposed between the rear end of said piston and the front end of said cap member in a pre-compressed condition, and a tubular resilient member disposed around said coil spring so that it is connected at the rear end to the front end of said cap member and is spaced a given distance from the rear end of said piston.

23. The automotive rear suspension as defined in claim 18, wherein said rear lateral link system is set to have a non-linear deformation characteristic.

24. The automotive rear suspension as defined in claim 23, wherein said rear lateral link system includes a rear lateral link extending laterally, which is connected at its laterally inward end to the vehicle body via a bush having a non-linear deformation characteristic.

25. The automotive rear suspension as defined in claim 24, wherein said bush disposed between said rear lateral link and said vehicle body comprises an inner tube, an outer tube coaxially disposed around said inner tube and a rubber member disposed between said inner and outer tubes, said rubber member being provided with an arcuate void on one side thereof relative to the inner tube and a pre-compressed portion defined by a pair of grooves formed therein on the opposite side, said arcuate void and said pre-compressed portion being positioned on the axial line of said rear lateral link.

26. The automotive rear suspension as defined in claim 23, wherein said rear lateral link comprises a wheel-side member, a vehicle-body side member and a connecting portion between said members having a resilient member disposed between them, said resilient member being set to have a non-linear deformation characteristic.

27. The automotive rear suspension as defined in claim 26, wherein said connecting portion comprises a cylinder formed on the end of said vehicle-body side member, a piston formed on the end of said wheel side member and slidably inserted into said cylinder, a pre-compressed rubber member disposed between the end surface of said piston and the end surface of said cylinder in such a manner that it is in contact with both end surfaces, and a hard rubber member disposed between said both end surfaces in such a manner that it is in contact with either one of said surface ends and is spaced from the other one of said surfaces by a given distance.

28. An automotive rear suspension comprising a wheel support for rotatably supporting the rear wheel, a pair of front and rear lateral link systems for supporting the wheel support on the vehicle body so that it is swingable in the vertical and longitudinal directions of the vehicle body, and a trailing link system for supporting resiliently either one of the wheel support and the connecting portion of the lateral links with the wheel support to the vehicle body so that the wheel support is allowed to travel a short distance in the longitudinal direction of the vehicle body, at least one of said front and rear lateral link systems being provided with a non-linear deformation means which exhibits a non-linear deformation characteristic with respect to compression force caused by force acting on the rear wheel and acting on the lateral link system, said trailing link systems being set to exhibit a non-linear deformation characteristic which has a given relation with said non-linear deformation characteristic of said lateral link system, and said front and rear lateral link systems including a front lateral link and rear lateral link which are arranged so that the connecting points of said lateral links to said wheel support are spaced in the longitudinal direction of the vehicle body to thereby produce toe-in movement in the rear wheel when the rear wheel is subjected to rearward force.

29. An automotive rear suspension comprising a wheel support for rotatably supporting the rear wheel, a pair of front and rear lateral link systems for supporting the wheel support on the vehicle body so that it is swingable in the vertical and longitudinal directions of the vehicle body, and a trailing link system for supporting resiliently either one of the wheel support and the connecting portion of the lateral links with the wheel support to the vehicle body so that the wheel support is allowed to travel a short distance in the longitudinal direction of the vehicle body, at least one of said front and rear lateral link systems being provided with a non-linear deformation means which exhibits a non-linear deformation characteristic with respect to compression force caused by lateral force acting on the rear wheel and acting on the lateral link system, said trailing link system being set to exhibit a non-linear deformation characteristic which has a given relation with said non-linear deformation characteristic of said lateral link system, and said front rear lateral link systems including a front lateral link and rear lateral link, the length of said front lateral link being shorter than said rear lateral link.

30. An automotive rear suspension comprising a wheel support for rotatably supporting a rear wheel, a pair of front and rear lateral link systems for supporting the wheel support on the vehicle body so that it is swingable in the vertical and longitudinal directions of the vehicle body and produces a toe-in movement in the rear wheel when the rear wheel is subjected to rearward force, and a trailing link system for supporting resiliently either one of the wheel support and the connecting portion of the lateral links with the wheel support to the vehicle body so that the wheel support is allowed to travel a short distance in the longitudinal direction of the vehicle body, at least one of said front and rear link system being provided with a non-linear deformation means which exhibits a non-linear deformation characteristic with respect to compression force caused by lateral force acting on the rear wheel and acting on the rear wheel and acting on the lateral link system, and said trailing link systems being set to have a large elastic modulus when rearward force acting on the rear wheel is below a given value and to have a small elastic modulus when the rearward force is greater than given value, so that the trailing link system is provided with a non-linear deformation characteristic which has a given relation with said non-linear deformation characteristic of said lateral link system.

31. The automotive rear suspension as defined in claim 30, wherein the wheel support supported by the trailing link system is moved rearward by the application of rearward force on the rear wheel to produce a toe-in movement in the rear wheel, the amount of which is larger than that of a toe-out movement in the rear wheel produced by the deformation of the lateral link systems.

32. The automotive rear suspension as defined in claim 31, wherein the non-linear deformation characteristic of said lateral link system with respect to the lateral force acting on the rear wheel is set so as to produce a toe-in movement in the rear wheel when the magnitude of the lateral force is below a given value and to produce a toe-out movement therein when the magnitude of the lateral force is larger than the given value.

33. The automotive rear suspension as defined in claim 31 wherein said rear lateral link system is set to have a non-linear deformation characteristic.

34. The automotive rear suspension as defined in claim 33, wherein said rear lateral link comprises a wheel-side member, a vehicle-body side member and a resilient member disposed between them, said resilient member being set to have a non-linear deformation characteristic.

35. An automotive rear suspension comprising a wheel support for rotatably supporting a rear wheel, a pair of front and rear lateral link systems for supporting the wheel support on the vehicle body so that it is swingable in the vertical and longitudinal directions of the vehicle body and produces a toe-in movement in the rear wheel when the rear wheel is subjected to rearward force, and a trailing link system for supporting resiliently either one of the wheel support and the connecting portion of the lateral links with the wheel support to the vehicle body so that the wheel support is allowed to travel a short distance in the longitudinal direction of the vehicle body, at least one of said front and rear link systems being provided with a non-linear deformation means which exhibits a non-linear deformation characteristic with respect to compression force caused by lateral force acting on the rear wheel and acting on the lateral link system, and said trailing link systems being set to have a non-linear deformation characteristic which has a given relation with said non-linear deformation characteristic of said lateral link system, wherein the deformation characteristic of the lateral link system provided by said non-linear deformation means is set to produce such movement in the rear wheel in turning condition that it is in the toe-in direction as lateral force acting on the rear wheel increases up to a given value and that it it is in the toe-out direction as the lateral force acting on the rear wheel increases from the given value.

36. The automotive rear suspension as defined in claim 35, wherein the wheel support supported by the trailing link system is moved rearward by the application of rearward force on the rear wheel to produce a toe-in movement in the rear wheel, the amount of which is larger than that of a toe-out movement in the rear wheel produced by the deformation of the lateral link systems.

37. The automotive rear suspension as defined in claim 36, wherein the non-linear deformation characteristic of said lateral link system with respect to the lateral force acting on the rear wheel is set so as to produce a toe-in movement in the rear wheel when the magnitude of the lateral force is below a given value and to produce a toe-out movement therein when the magnitude of the lateral force is a larger than the given value.

38. The automotive rear suspension as defined in 36, wherein said rear lateral link system is set to have a non-linear deformation characteristic.

39. The automotive rear suspension as defined in claim 38, wherein said rear lateral link comprises a wheel-side member, a vehicle-body side member and a resilient member disposed between them, said resilient member being set to have a non-linear deformation characteristic.

* * * * *